(No Model.) 2 Sheets—Sheet 1.
J. H. & C. BURKHOLDER.
CORN CUTTER.
No. 441,744. Patented Dec. 2, 1890.
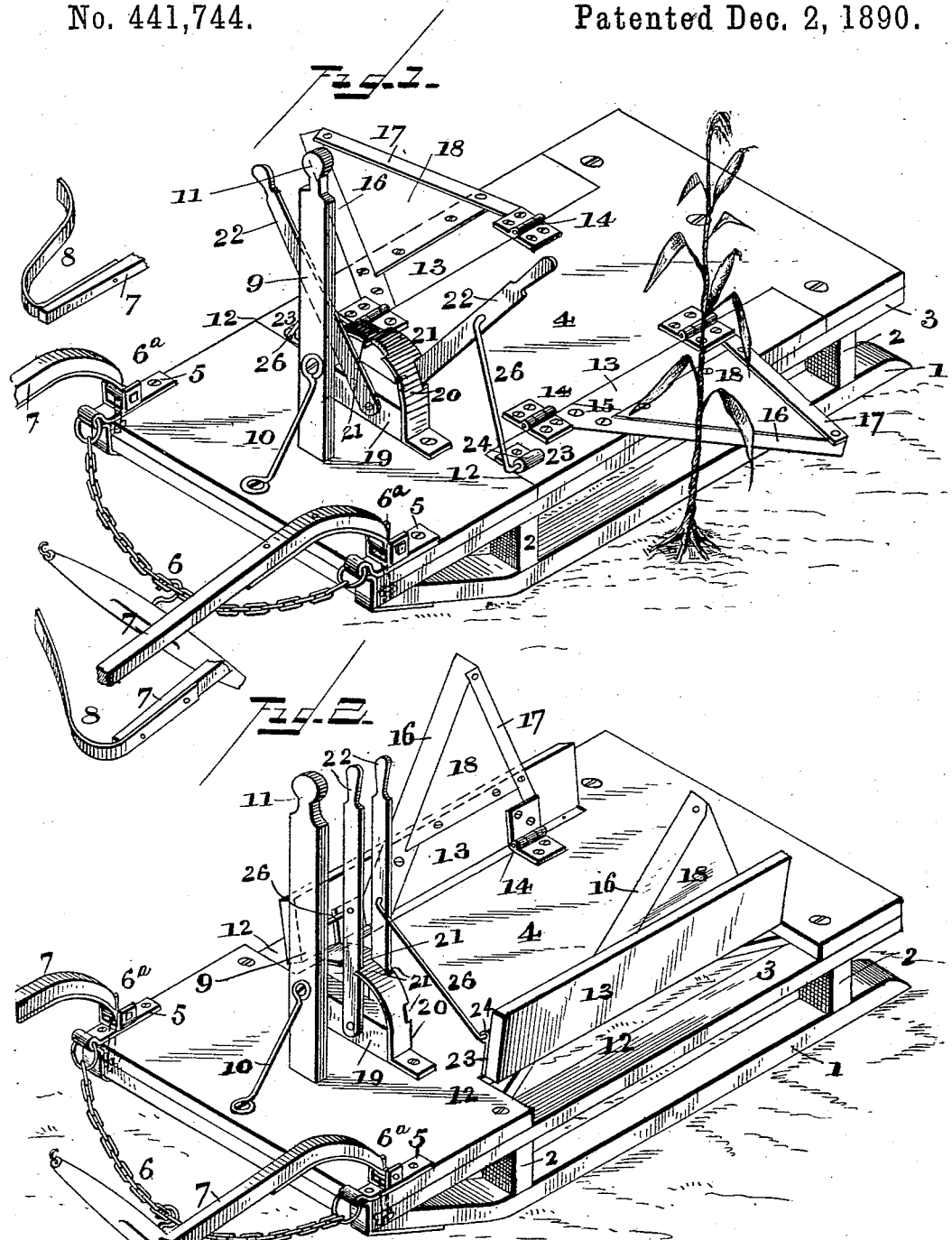
Witnesses:
F. L. Ourand
W. S. Duvall
Inventors
Jonathan H. Burkholder and
Christ Burkholder
By their Attorneys,
C. A. Snow & Co.
THE NORRIS PETERS CO., PHOTO-LITHO., WASHINGTON, D. C.

(No Model.) 2 Sheets—Sheet 2.
J. H. & C. BURKHOLDER.
CORN CUTTER.
No. 441,744. Patented Dec. 2, 1890.
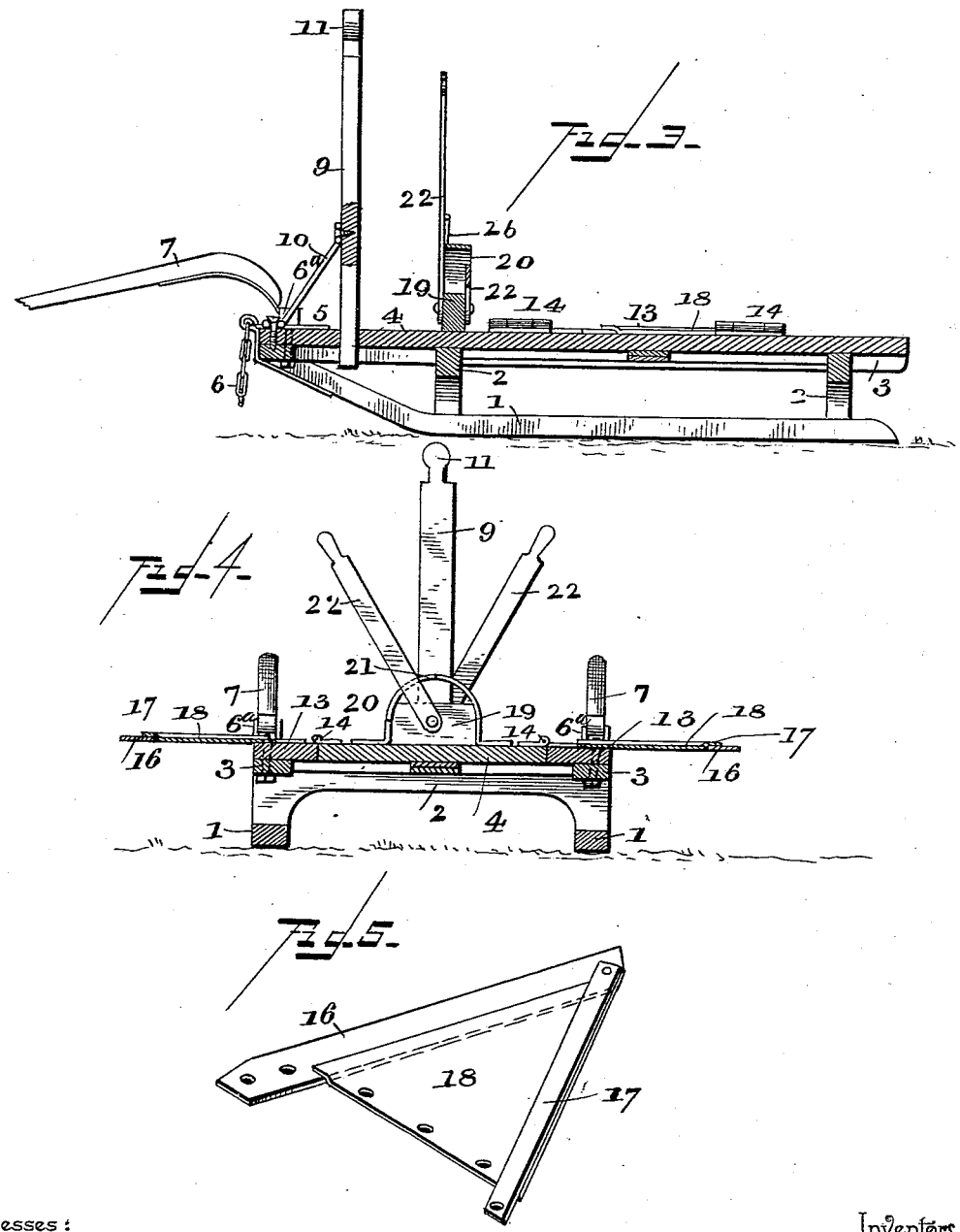

UNITED STATES PATENT OFFICE.

JONATHAN H. BURKHOLDER AND CHRIST. BURKHOLDER, OF RIDGEVILLE CORNERS, OHIO.

CORN-CUTTER.

SPECIFICATION forming part of Letters Patent No. 441,744, dated December 2, 1890.

Application filed June 17, 1890. Serial No. 355,729. (No model.)

*To all whom it may concern:*

Be it known that we, JONATHAN H. BURKHOLDER and CHRIST. BURKHOLDER, citizens of the United States, residing at Ridgeville Corners, in the county of Henry and State of Ohio, have invented a new and useful Corn-Cutter, of which the following is a specification.

This invention has relation to corn-harvesters; and the objects of the invention are to produce a very simple harvester adapted to be drawn between and to sever simultaneously two rows of corn, to provide means for elevating the cutters when not in use, whereby they are prevented from injury during transportation to and from the field, and to provide means for preventing any injury to the horse drawing the harvester by reason of contact with the cutters.

Other objects and advantages of the invention will hereinafter appear, and the novel features thereof will be particularly pointed out in the claims.

Referring to the drawings, Figure 1 is a perspective. Fig. 2 is a similar view, the cutters thrown out of operative position. Fig. 3 is a longitudinal section. Fig. 4 is a transverse section. Fig. 5 is a detail in perspective of one of the cutters.

Like numerals indicate like parts in all the figures of the drawings.

1 designates a pair of opposite runners, connected by the usual cross-beams or knees 2, which knees are connected by longitudinal side bars 3, let into the opposite ends of the same, and connected at their front ends to the front ends of the runners. Upon the frame-work thus constructed is laid the platform 4, which at its front end is provided with a pair of opposite metallic straps 5, in which is fastened the opposite ends of the draft-chain 6, connected at its center with an ordinary singletree, to which is harnessed the horse. Through this chain the draft is applied, so that the machine is designed to be drawn evenly, as will be apparent. Passing through each of the straps just mentioned, the platform, longitudinal side bar, and the runners is a pair of oppositely-swiveled brackets 6ª, in each of which is pivoted a thill or shaft 7, to the front ends of each of which is secured a flexible leather strap 8. The front ends of the straps 8 are designed for connection with the hames of the harness, and the thills are not provided for draft purposes, but simply to prevent the animal from turning too abruptly and coming in contact with the side cutters, to be hereinafter described, and as will hereinafter be readily apparent.

Between the thills, at the front end of the platform, is secured a standard 9, securely braced by a diagonal brace 10, bolted to the standard and to the platform. The upper end of the standard is provided with a head 11, formed by a slight reduction of the standard, a distance below its end, and around the head is adapted to be secured the reins during the process of harvesting.

The opposite sides or edges of the platform are provided with cut-away portions or recesses, as at 12, extending for some distance, and fitting the same are wings 13, hinged to the inner edges of said recesses, as at 14, whereby said wings may be folded over upon the platform or outwardly into the recesses flush with the edges and top of the platform, and will rest upon the side bars or beams 3. Bolted, as at 15, to the upper surface of each of the wings 13, a slight distance in rear of their front ends, is a rearwardly-disposed knife 16, braced at its outer end by means of a forwardly-disposed brace 17, bolted to the free end of the knife and to the rear end of the wing. The spaces between the knives and their braces are occupied by metallic triangular plates 18, bolted to the wings, the knives, and braces.

19 designates a block rigidly secured to the platform in rear of the rein-standard 9, and said block is embraced at its ends by means of an inverted-U-shaped locking-standard 20, the diagonally-opposite halves of which are at their edges recessed, as at 21. Bolted to the opposite faces of the block 19 is a pair of levers 22, each of which projects up into one of the recesses 21, and is adapted to swing downward and upward to a point limited by the ends of the recesses, which form stops for said levers. Brackets 23 are secured at the front ends of each of the wings, and are provided with bearing-eyes 24, as shown, and connecting the bracket of a wing with its respective lever is a connecting-rod 26, the opposite ends of which are bent to form bearing portions for connection with the eyes and levers. The horse being connected to the draft-chain between the thills, it will be apparent that said thills will only permit the animal to turn a short distance, and will not permit him to back or double upon the harvester and its knives, as would be the case if nothing but a flexible connection—as, for instance, a draft-chain—were employed.

In operation the attendants occupy the platform, as is usual in this class of invention, and as the stalks are cut by the cutters, which act in a knife-like manner upon the same, they are caught and held upon the triangular metallic plate until a sufficient number have been collected to form an armful, after which they are deposited at the shock in the usual manner, and the operation continuously repeated. By raising the levers to a vertical position the wings and cutters are elevated, as shown in Fig. 2, and prevented from any accidental contact with obstacles while passing to and from the field. Either or both cutters may also, by reason of the levers, be raised or lowered to pass over obstructions in the path of the machine—as, for instance, shocks, stumps of trees, bowlders, &c.

Having described our invention, what we claim is—

1. A corn-harvester provided at its front end with a pair of separately-swiveled thills swinging in the same plane, substantially as specified.

2. A corn-harvester provided at its front end with a pair of opposite metallic straps, a draft-chain connected at its ends to the straps, swiveled brackets mounted in the straps, and thills pivoted at their rear ends in the brackets and provided at their front ends with flexible straps adapted for connection with the hames of a harness, substantially as specified.

3. In a corn-harvester, the combination, with the platform thereof, the opposite edges of which are provided with longitudinal recesses, of wings fitting said recesses and hinged to the inner edges thereof, inclined knives projecting outwardly from the wings, a pair of pivoted levers located between the wings, connecting-rods connecting each lever with a wing, and means for locking the levers in a raised or lowered position, substantially as specified.

4. In a corn-harvester, the combination, with the platform, the opposite edges of which are longitudinally recessed, of a pair of opposite wings located in and fitting the recesses, hinges connecting the wings with the inner edges of the recesses, rearwardly-disposed knives or cutters projecting outwardly from the wings, forwardly-disposed braces connecting the free ends of the knives with the wings, an intermediate triangular metallic plate occupying the space between the knife wing and brace, and means for raising and lowering the wings, substantially as specified.

5. A corn-harvester having at the front end the swiveled brackets 6ª and the thills pivoted in the brackets, as set forth.

6. A corn-harvester provided at its front end with a pair of opposite metallic straps, a draft-chain connected at its ends to the straps, swiveled brackets mounted in the straps, and thills pivoted at their rear ends in the brackets, substantially as specified.

7. In a corn-harvester, the combination, with the platform thereof, the opposite edges of which are provided with longitudinal recesses, of wings fitting said recesses and hinged to the inner edges thereof, inclined knives projecting outwardly from the wings, a pair of pivoted levers located between the wings, and connecting-rods connecting each lever with a wing, and the standard 20, provided with opposite locking-shoulders for the levers, substantially as specified.

8. In a corn-harvester, the side wings provided with knives or cutters consisting of the triangular plate 18, the knives 16, and the braces 17, connecting the plate with the wings and also attached to the free ends of the knives, as set forth.

In testimony that we claim the foregoing as our own we have hereto affixed our signatures in presence of two witnesses.

JONATHAN H. BURKHOLDER.
CHRIST. BURKHOLDER.

Witnesses:
SAMUEL BAER,
F. A. DEITS.